May 11, 1948.  E. GOSMANN ET AL  2,441,353
METHOD OF DISASSEMBLING ARTICLES
Filed Sept. 26, 1946  2 Sheets-Sheet 1
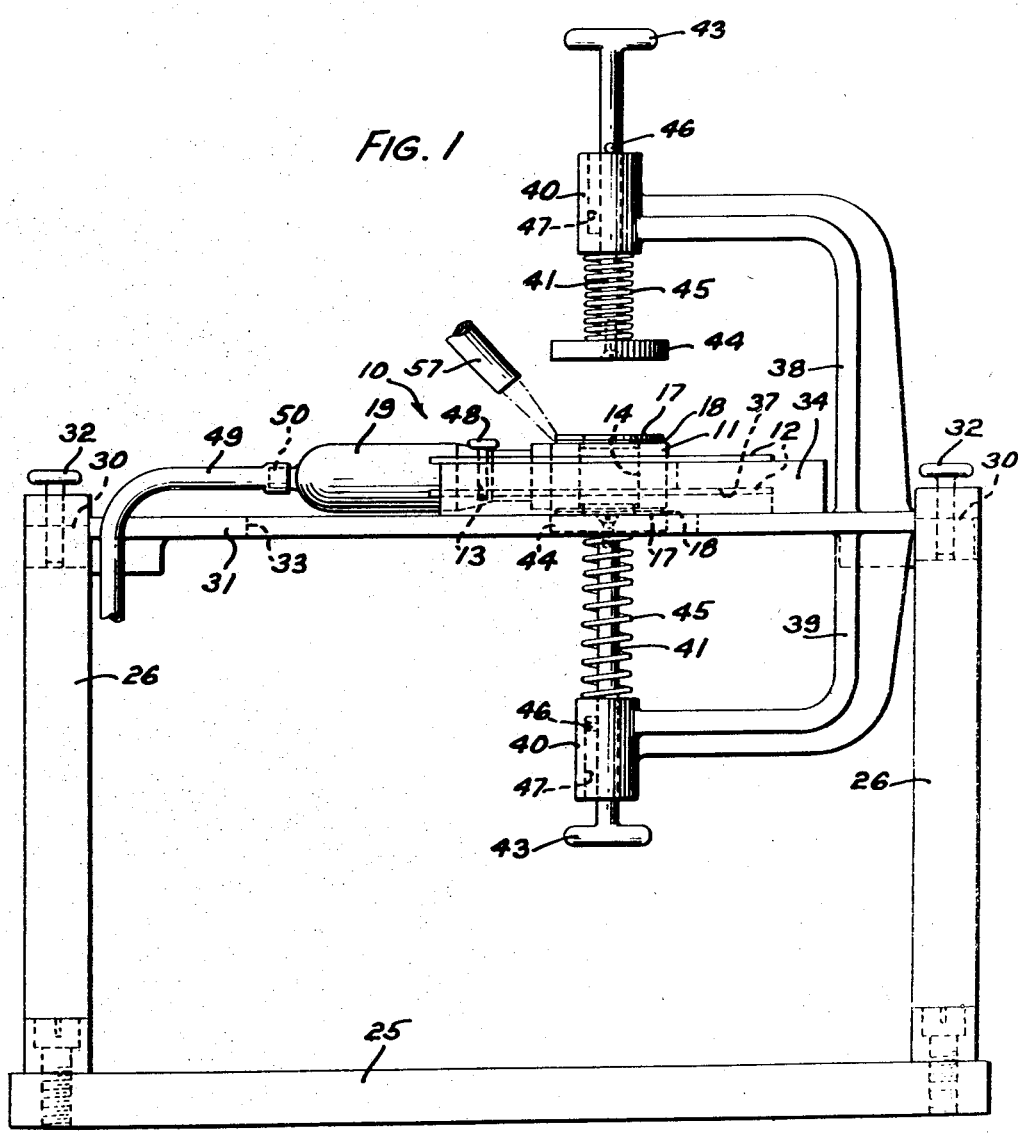
INVENTORS
E. GOSMANN
K. A. WESTON
BY
ATTORNEY May 11, 1948.  E. GOSMANN ET AL  2,441,353
METHOD OF DISASSEMBLING ARTICLES
Filed Sept. 26, 1946  2 Sheets-Sheet 2
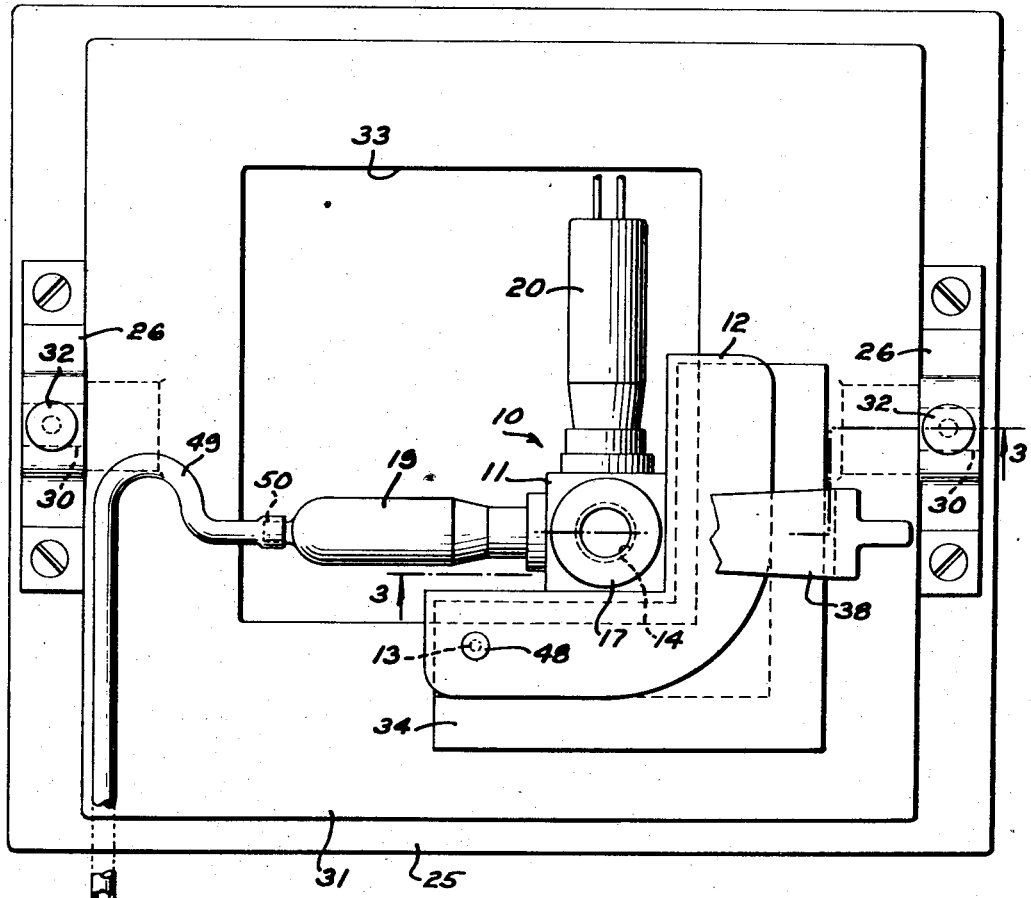
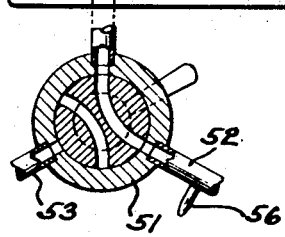
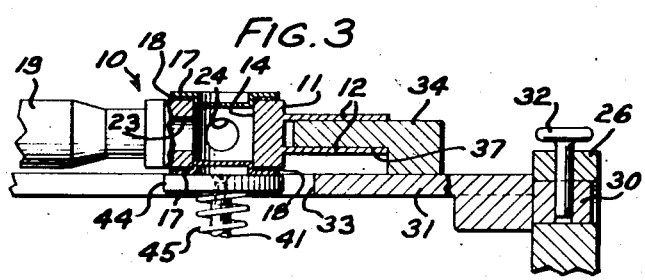
INVENTORS
E. GOSMANN
K. A. WESTON
BY E. F. Kane
ATTORNEY Patented May 11, 1948

2,441,353

UNITED STATES PATENT OFFICE 2,441,353

METHOD OF DISASSEMBLING ARTICLES

Enart Gosmann, Elmwood Park, Ill., and Keith A. Weston, St. Paul, Minn., assignors to Western Electric Company, Incorporated, New York, N. Y., a corporation of New York Application September 26, 1946, Serial No. 699,412

9 Claims. (Cl. 316—2)

This invention relates to methods of disassembling articles, and more particularly to a method of removing brazed parts from defective vacuum tube assemblages for subsequent repair of the tubes.

An object of this invention is the provision of an efficient and effective method of removing brazed parts from assemblages without deleterious effect thereto.

In accordance with the above object of this invention as practiced in connection with the disassembling of vacuum tubes for subsequent repair, in which the tubes are provided with copper end caps solder-brazed to a copper body for closing opposite ends of a central cavity therein and to which are sealed one or more glass envelopes communicating with the central cavity, an acetylene torch is applied to the brazed joints, one at a time, while the tube is supported in a fixture having two pressure pads, one for each cap, with the pad for the cap being removed retracted therefrom and the pad for the following cap to be removed pressing thereon. Simultaneously therewith, a mixture of carbon dioxide and methanol vapor gas or other suitable protective and reducing atmospheres is applied under pressure through one of the envelopes to the central cavity of the tube body to purge it of air and thus prevent oxidation thereof. When the solder is sufficiently softened, the gas pressure is suddenly increased inside the tube to blow the cap off the body, thus insuring that the inside surfaces of the tube are maintained clean and free of oxides. While the applied increased gas pressure is still flushing out through the opening left by the removed cap, the associated spaced pressure pad is permitted to move over the opening to seal the same, whereupon the pad associated with the second cap is withdrawn therefrom and thereafter, in a manner similar to that described above, the second cap is released and blown off the tube body.

Other objects and advantages of this invention will more fully appear from the following detail description taken in conjunction with the accompanying drawings which illustrate an apparatus by means of which the method may be practiced, in which Fig. 1 is an elevational view of an apparatus used in practicing the method showing a vacuum tube mounted thereon in preparation of removing the brazed end caps thereupon in succession;

Fig. 2 is a fragmentary plan view thereof; and

Fig. 3 is a vertical sectional view taken on the line 3—3 of Fig. 2.

Referring to the drawings in detail, and particularly to Figs. 1 and 3, wherein the invention has been applied to the disassembling of one type of vacuum tube assemblage, indicated in general by the numeral 10. Such an assemblage comprises and includes, among other elements, a rectangular shaped copper shell or body 11 having a pair of cooling fins 12 projecting from two angularly arranged faces of the body. Formed in the ends of the fins 12 is a pair of aligned apertures 13, which are used for attaching to the tube an element (not shown), which cooperates with the tube when in use. Opposite ends of a central cavity 14 in the body 11 are provided with copper end covers or caps 17 which are sealed to the body by ring-shaped pieces of silver solder 18 fused during a brazing operation to unite the caps to the body. Sealed to the body 11 are closed glass envelopes 19 and 20, which communicate with the central cavity 14 by means of apertures 23 and 24, respectively (Fig. 3), formed in the body. In order to salvage a tube assemblage 10 which has become defective, for one reason or another, it is necessary, for the purpose of gaining access to the central cavity 14 of the body 11, to repair its defectiveness to remove the caps 17 therefrom without deleterious effect to the assemblage 10. For this purpose, the following described method and an apparatus for facilitating the practice of the method has been devised.

One form of the apparatus may comprise a base plate 25 provided with two spaced standards 26 upon which is pivoted as indicated at 30—30, a table-like member 31 adapted to be rotated to present either of its main faces uppermost and horizontal and when so positioned to be maintained thereat by locking pins 32 enterable into aligned apertures in the standards 26 and pivots 30—30 when the member 31 has been rotated 180° from one position to the other. Formed in the member 31 is a rectangular shaped opening 33 and attached to one main face of the member and extending along two sides of the opening is an L-shaped member 34 which is under-cut, as indicated at 37 (Fig. 3), along its bottom face with the member 31 in the position shown in the several figures of the drawing. Formed integral with the member 31 and extending from its main faces are L-shaped arms 38 and 39 having aligned sleeve-like portions 40 upon their free ends, which portions are disposed perpendicular to the main faces of the member 31. Reciprocable in the portions 40 of the arms 38 and 39 are rods 41 having handle portions 43 at their outer ends and carrying circular pads 44 at their inner ends. Coiled compression springs 45 surrounding the rods 41 and abutting opposed faces of the sleeve-like portions 40 and the pads 44 serve to move the pads toward each other into their operative positions unless they are held in their retracted positions by laterally extending pins 46 carried by the rods 41 and arranged to rest upon the outer end faces of the sleeve-like portions 40, as shown in Fig. 1, in the position of the upper pad 44. When the pads 44 are to be moved to their operative positions, as shown in Figs. 1 and 3, to the position of the lower pad, the rod 41 is rotated 180° to align the pin 46 resting at the time upon the outer end face of the sleeve-like portion 40 with a slot 47 formed longitudinally in the inner periphery of the portion 40 and the rod is then lowered to enter the pin in the slot, the slot being of such length that the pad 44 will reach its operative position under the pressure of the spring 45 before the pin engages the bottom of the slot.

In practicing the method of disassembling or removing the caps 17 from the described type of vacuum tube assemblage 10 with the hereinbefore described apparatus, the assemblage is first mounted in the apparatus, as shown in the drawings, by sliding the assemblage into position upon the L-shaped member 34 to the position shown in Figs. 2 and 3, whereupon a locking pin 48 is inserted through the aligned apertures 13 in the pins 12, disposed at opposite faces of the member 34 and an aperture in the member 34. At the time the assemblage 10 is thus mounted on the apparatus, the pads 45, coaxially aligned with the caps 17, are retained in their retracted positions in the manner previously described, as shown by the position of the upper pad 44 in Fig. 2 and the table-like member 31 is locked in a horizontal position by the pins 32 previously described. The lower pad 44 is then released and permitted to press against the lower cap 17 while the upper pad 44 remains retracted, as shown in Fig. 1.

While thus mounted on the apparatus, a mixture of carbon dioxide gas (CO₂) and methanol vapor or other suitable protective atmosphere and reducing agent is directed to the interior cavities of the tube assemblage 10 by means of a rubber hose 49 inserted over a tubular extension or tip 50 on the glass envelope 19, the extension 50 being first opened to permit communication with the interior of the assemblage. The flow of the above-described gas may be controlled by a suitable valve 51, illustrated diagrammatically in Fig. 2, which is connected by conduits 52 and 53 to low and high pressure sources of gas, respectively (not shown). The interior of the tube assemblage is first flushed of air with low pressure gas supplied through the conduit 52, valve 51 and hose 49, using a by-pass or outlet nozzle 56 in the conduit 52 to reduce the pressure of the gas to approximately atmospheric pressure. During the flushing of the interior of the tube assemblage, a suitable flame from a hand-directed acetylene torch 57 is played on the brazed joint of the cap 17 to the body 11 and, upon the operator observing that the solder has melted, the excess solder is wiped off with a brush and then the valve 51 is quickly operated to connect the high pressure gas through the conduit 53, valve 51 and hose 49 to the interior of the tube assemblage, which serves to blow the released cap 17 off the body 11 without deleterious effect on the assemblage. In addition, the inside surfaces of the assemblage will be maintained clean and free of oxides.

During the application of the high pressure gas, it will be understood that the low pressure gas connected to the conduit 52 is cut off so that the valve 51 is not connected to atmosphere by means of the nozzle 56. Before applying the flame from the acetylene torch, it is desirable to preheat the assemblage 10 to prevent damage thereto from the sudden application of the intense heat from the torch flame. This may be accomplished by playing flames of low intensity on the assemblage from a burner during the flushing operation or by placing the assemblages on a hot plate previous to their mounting on the apparatus.

Following this last described step, and while the high pressure gas is still flushing out through the opening left by the removed cap 17, the spring-pressed pad 44, which is retracted from the opening, is released and lowered to engage the body 11 and thus sealing the opening. Thereafter, the locking pins 32 are withdrawn and the table-like member 31 is rotated 180° about its pivots 30—30 and the pins reinserted to lock the member 31 in its newly rotated position. During the rotation of the table-like member 31, the rubber hose 49 is left connected to the glass envelope 19, the hose being of sufficient length to permit this rotation of the member 31 without disturbing its connections to the valve 51 or the glass envelope 19. With the member 31 in the latter position, the pad 44 previously in the lowermost position, as shown in Fig. 2, is now in the uppermost position, whereupon it is retracted from the associated cap 17 and retained in its retracted position in the manner previously described. The valve 51 is now operated to connect the low pressure gas to the interior of the assemblage and, in the manner similar to that described hereinbefore, the second cap 17 is released and blown off the tube body 11.

What is claimed is:

1. The method of removing from a normally sealed hollow article an element brazed thereto for closing an opening to the interior of the article which comprises providing another opening to said interior, applying a protective gas through said other opening to flush said interior, subjecting the joint of brazing to sufficient heat to melt the brazing material, and while the brazing material is molten, increasing the pressure of said protective gas to said interior sufficiently to blow the element from the article.

2. The method of removing from a normally sealed hollow article an element solder brazed thereto for closing an opening to the interior of the article which comprises providing another opening to said interior, applying carbon dioxide gas under approximately atmospheric pressure through said other opening to flush said interior, subjecting the joint of brazing to sufficient heat to melt the solder, and while the solder is molten, suddenly increasing the pressure of said carbon dioxide gas to said interior sufficiently to blow the element from the article.

3. The method of removing from a normally sealed hollow article an element brazed thereto for closing an opening to the interior of the article, which comprises providing another opening to said interior, applying a carbon dioxide and methanol vapor gas through said other opening to flush said interior, subjecting the joint of brazing to sufficient heat to melt the brazing material, and, while the brazing material is molten, suddenly increasing the pressure of said carbon dioxide and methanol vapor gas to said interior sufficiently to blow the element from the article.

4. The method of removing from a normally sealed hollow article an element brazed thereto for closing an opening to the interior of the article which comprises providing another opening to the interior of the article, flushing the interior of the article with a reducing gas through said other opening, simultaneously heating the article to fuse the brazing material and, upon the brazing material becoming fused, suddenly increasing the pressure of the reducing gas to flow the element from the article.

5. The method of removing from a normally sealed hollow article an element brazed thereto for closing an opening to the interior of the article which comprises providing another opening to the interior of the article, flushing the interior of the article with a reducing gas through said other opening, simultaneously heating the article to fuse the brazing material and, upon the brazing material becoming fused, suddenly increasing the pressure of the reducing gas to flow the element from the article and continuing the flushing of the reducing gas through the article until the article is sufficiently cooled to reduce the possibility of an excess of oxide forming on the article.

6. The method of removing from a normally sealed hollow article an element brazed thereto for closing an opening to the interior of the article which comprises providing another opening to the interior of the article, directing a reducing gas at low pressure to the interior of the article through said other opening to flush oxidizing gases from the interior of the article, heating the article during the flushing thereof to fuse the brazing material, holding the element on the article during said flushing operation, suddenly increasing the pressure of the reducing gas when the brazing material becomes fused to forcibly eject the element from the article, and continuing to flush the interior of the article with said reducing gas to prevent oxidation of the interior thereof.

7. The method of removing from a normally sealed hollow article elements brazed thereto for closing openings to the interior of the article which comprises providing another opening to the interior of the article, flushing the interior of the article with a reducing gas through said other opening, simultaneously heating the article to fuse the brazing material at said one element, suddenly increasing the pressure of the reducing gas to blow said one element from the article, and sealing the opening to the article formed by blowing said one element from the article during the removal of a second element from the article.

8. The method of removing from a normally sealed hollow article elements brazed theerto for closing openings to the interior of the article which comprises providing another opening to the interior of the article, directing a reducing gas at low pressure to the interior of the article through said other opening to flush oxidizing gases from the interior of the article, simultaneously heating the article to fuse the brazing material, and, upon the brazing material at said one element becoming fused, suddenly increasing the pressure of the reducing gas to forcibly eject said one element from the article, continuing to flush the interior of the article with said reducing gas of increased pressure to prevent oxidation of the interior thereof, and resiliently sealing the opening to the article formed by blowing said one element from the article while the flushing continues and during the removal of a second element from the article.

9. The method of removing from a normally sealed vacuum tube a cover brazed to the body of the tube for closing an opening to the interior of the tube in communication with a glass envelope having a closed tubular extension which comprises providing an opening in the tubular extension, flushing the interior of the tube with a reducing gas through said opening in the tubular extension, simultaneously heating the body of the tube to fuse the brazing material and, upon the brazing material becoming fused, suddenly increasing the pressure of the reducing gas to blow the cover from the body of the tube.

ENART GOSMANN.
KEITH A. WESTON.

REFERENCES CITED

The following references are of record in the file of this patent:

UNITED STATES PATENTS

| Number | Name | Date |
|---|---|---|
| 2,342,045 | Fuller | Feb. 15, 1944 |